No. 867,938. PATENTED OCT. 15, 1907.
J. R. BEAMER.
STUFFING BOX.
APPLICATION FILED JAN. 14, 1907.
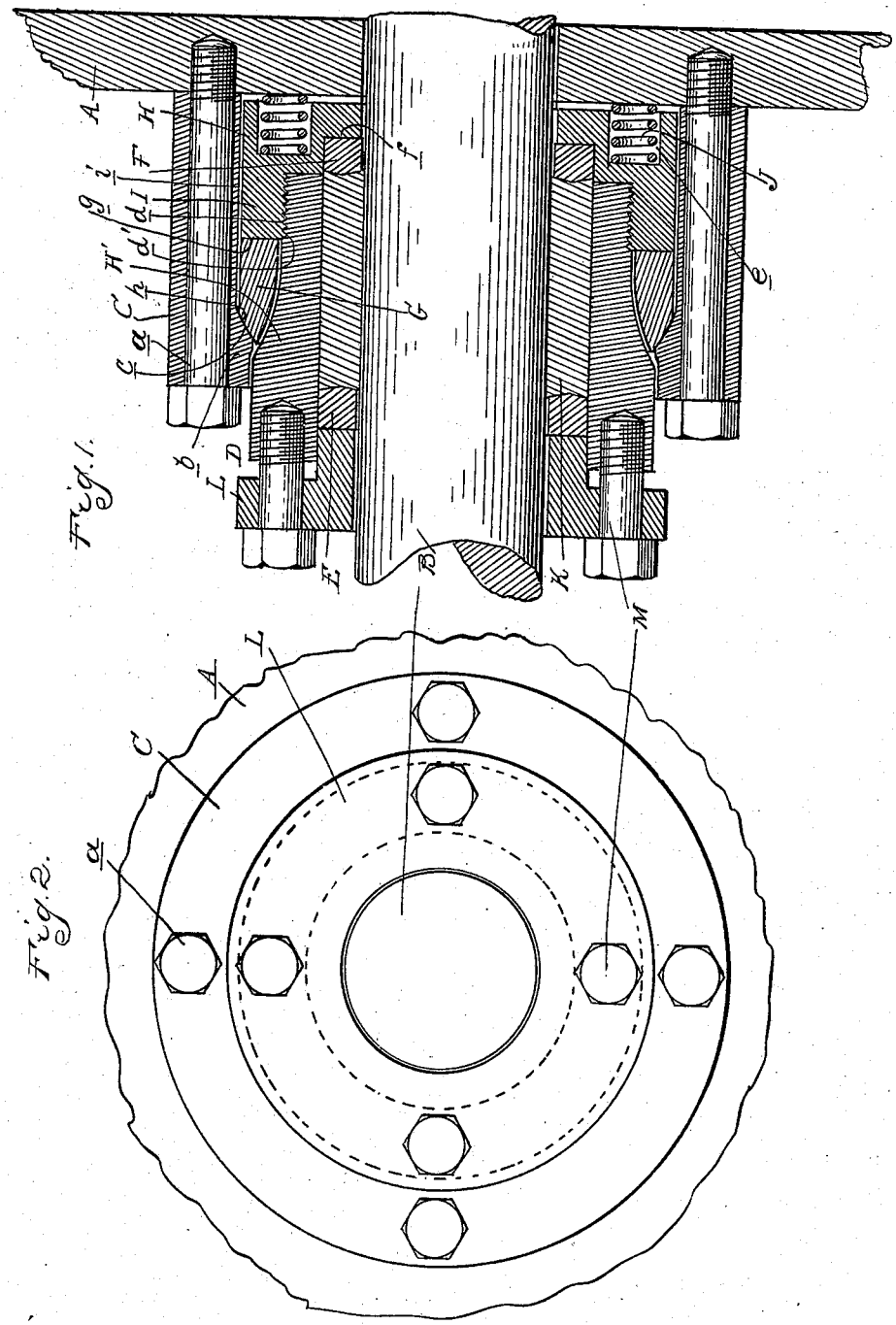

UNITED STATES PATENT OFFICE.

JAMES R. BEAMER, OF DETROIT, MICHIGAN.

STUFFING-BOX.

No. 867,958.　　　　Specification of Letters Patent.　　　　Patented Oct. 15, 1907.

Application filed January 14, 1907. Serial No. 352,272.

*To all whom it may concern:*

Be it known that I, JAMES R. BEAMER, a citizen of the United States of America, residing at Detroit, in the county of Wayne and State of Michigan, have invented certain new and useful Improvements in Stuffing-Boxes, of which the following is a specification, reference being had therein to the accompanying drawings.

The invention relates to a stuffing box for piston rods or valve stems of the self-adjustment type, adapted, as is usually termed, to float with the rod or stem, or automatically compensate for any angular or out of line movement of the rod, and consists in the novel and peculiar construction of the stuffing box, in the arrangement and combination of its parts, and in various details of construction, as will be hereinafter set forth.

In the drawings,—Figure 1 is a vertical central section through my improved stuffing box, and a portion of the cylinder head, showing the stem or rod in elevation; and Fig. 2 is an end elevation.

In the drawings thus briefly described, A represents a cylinder head and B the reciprocating rod or stem extending centrally therethrough.

C is a suitable casing,—preferably in the form of a flanged box,—secured to the cylinder head by suitable bolts, as $a$. The flange $b$ of the casing extends inwardly, and is provided with a concave ground face or surface $c$.

D represents the stuffing box arranged within the casing and spaced from the rod or stem in this instance by compression rings E F, and from the casing or flanged box by a bearing ring G, this arrangement holding the stuffing box out of contact with the moving parts, thus preventing wear and the necessity of replacement.

The stuffing box described is composed in this instance of a flanged ring H, and a sleeve H′ preferably detachably connected to the ring H and extending a slight distance beyond the front of the casing C. The flange I of the ring H is internally threaded, as at $d$, to engage a corresponding thread $d'$ formed upon the sleeve. The rear face of the ring H is provided with a plurality of sockets, as $e$, and in the portion of the ring adjoining the valve stem or rod is provided an annular recess or seat $f$, which receives the compression ring F, the latter projecting below the ring H to form a clearance between the latter and the stem.

The bearing ring G is provided with a ground plane face $g$, which engages a corresponding face formed upon the outer end of the flange I, and at its opposite end it is provided with a convex ground face $h$, which contacts with, and conforms in configuration to, the ground surface $c$ upon the casing. The parts are so proportioned that a space or clearance $i$ is provided between the rings G and H and the interior of the casing, and between the rear face of the ring H and the cylinder head. This permits the stuffing box to move laterally relative to the casing, to compensate for out of line movement of the stem or rod, and to rock upon the curved faces $c\,h$ to adapt itself to any angular movement of the stem.

A plurality of springs, as J, are arranged within the sockets $e$, and abut against the cylinder head, acting to force the stuffing box forwardly to form a tight joint between the adjoining faces of the casing and bearing ring.

As thus constructed, it will be observed that the steam is admitted from the interior of the cylinder back of the stuffing box, and acts in connection with the springs to keep the joint tight and prevent leakage.

Between the stuffing box proper and the rod or stem is arranged packing material of any suitable character, such as K, and this is properly compressed so as to form a steam-tight joint by means of the compression rings E F, the former ring being forced inwardly to effect the compression by a suitable gland, as L, connected to the stuffing box by bolts M.

From the foregoing description of my invention, it will be seen that the packing material may be removed or replaced from the front of the stuffing box by merely removing the gland and the compression ring. Furthermore, the stuffing box is almost entirely inclosed within the casing, thus occupying a minimum amount of space and permitting the application of the box to any kind of rod or stem.

The compression rings for the packing are preferably sectional, so as to be readily applied to the stem or rod, and in serving to space the box from the stem act as wear rings. After they have been in use for a sufficient period of time to wear flush, or approximately so, with the box proper, they can be readily removed at a small expense and other rings substituted, thus dispensing with the necessity of furnishing a new box. A plurality of relatively small springs, such as J, applied to the box in the manner and for the purpose described, are superior to the ordinary single spring employed in that they are less costly; and, secondly, in the event they become broken they can be readily replaced at small expense.

What I claim as my invention is,—

1. The combination with a cylinder head, of a casing secured thereto, a stuffing box mounted within the casing for compensating movement, and an adjustable gland for compressing the packing within the box.

2. The combination with a cylinder head and a reciprocating stem or rod, of a casing secured to the head, a stuffing box mounted within the casing for rocking and relative transverse movement, a compression member within the box, and an adjustable manually operable gland for the compression member.

3. The combination with a cylinder head, of the stem or rod extending therethrough, a casing secured to the head, an automatically adjustable stuffing box within the casing, and spacing means associated with the box for holding the latter out of engagement with the rod.

4. The combination with a cylinder head, of a casing secured thereto, a stuffing box mounted within the casing for compensating movement, compression rings within the box and an external adjustable gland for the rings.

5. The combination with a cylinder head, of a stem or rod, a casing connected to the head, a stuffing box arranged within the casing for compensating movement, compression rings within and extending beyond the box, spacing the latter from the stem or rod, and a gland for adjusting the rings.

6. The combination with a cylinder head, of the casing secured thereto, a stuffing box within and having a rocking bearing upon the casing, and a plurality of springs interposed between the cylinder head and stuffing box, acting to hold the latter in engagement with the casing.

7. The combination with a cylinder head, of a casing secured thereto, a stuffing box within the casing comprising an annular flanged member adjoining the head, and an elongated sleeve detachably connected to the annular section, a bearing ring encircling the sleeve and having a rocking bearing against the casing, and a plurality of springs interposed between the head and stuffing box holding the bearing ring in rocking engagement with the casing.

8. The combination with a cylinder head, of a casing secured thereto, a stuffing box within the casing comprising an annular flanged member adjoining the head, and an elongated sleeve detachably connected to the annular section, a bearing ring encircling the sleeve and having a rocking bearing against the casing, a plurality of springs interposed between the head and stuffing box for holding the bearing ring in rocking engagement with the casing, sectional compression rings within the box, and an external gland for shifting one of the rings in relation to the other.

9. The combination with a cylinder head, of a casing secured thereto, a stuffing box mounted within the casing for universal compensating movement, and a gland operable from the exterior of the casing for compressing the packing within the box.

In testimony whereof I affix my signature in presence of two witnesses.

JAMES R. BEAMER.

Witnesses:
JAMES P. BARRY.
NELLIE KINSELLA.